United States Patent
Yaguchi et al.

(10) Patent No.: US 7,016,691 B2
(45) Date of Patent: Mar. 21, 2006

(54) MOBILE TELECOMMUNICATIONS SYSTEM AND A MOBILE TELECOMMUNICATIONS CONTROL METHOD

(75) Inventors: Yoshiharu Yaguchi, Kanagawa (JP); Shunji Sato, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 85 days.

(21) Appl. No.: 10/738,218

(22) Filed: Dec. 18, 2003

(65) Prior Publication Data

US 2005/0037756 A1    Feb. 17, 2005

(30) Foreign Application Priority Data

Dec. 18, 2002   (JP)   ............... P.2002-366806

(51) Int. Cl.
*H04Q 7/20*   (2006.01)

(52) U.S. Cl. .............. 455/456.1; 455/442; 455/574; 455/522; 455/436; 455/440; 455/441; 455/67.1; 455/69

(58) Field of Classification Search .......... 455/442, 455/574, 522, 456.1, 436, 440, 441, 67.1, 455/69
See application file for complete search history.

(56) References Cited

U.S. PATENT DOCUMENTS

| | | | |
|---|---|---|---|
| 5,884,178 A | 3/1999 | Ericsson et al. | |
| 6,337,990 B1 * | 1/2002 | Koshino | 455/574 |
| 2002/0115465 A1 * | 8/2002 | Komatsu | 455/522 |
| 2004/0097234 A1 * | 5/2004 | Rajkotia et al. | 455/442 |

FOREIGN PATENT DOCUMENTS

| | | |
|---|---|---|
| JP | 2001-218244 A | 8/2001 |
| JP | 2002-27522 A | 1/2002 |
| JP | 2002-199428 A | 7/2002 |

* cited by examiner

*Primary Examiner*—Joseph Feild
*Assistant Examiner*—David Q. Nguyen
(74) *Attorney, Agent, or Firm*—McDermott Will & Emery LLP

(57) ABSTRACT

Regulating the unnecessary handover control count and reducing the power consumption of a radio mobile station thereby reducing the load on an entire radio telecommunications system to maintain stable communications.

By adding a position calculator, a direction calculator and a velocity calculator to a radio mobile station and adding the information on a radio base station and the peripheral radio base stations into report information used by the radio base station, handover control considers the position, direction, and velocity as well as the downlink communications quality according to the related art. This regulates the unnecessary handover control count and reduces the load on the entire radio telecommunications system and the power consumption of the radio mobile station.

10 Claims, 10 Drawing Sheets

FIG. 3

RADIO MOBILE STATION INFORMATION AND PERIPHERAL RADIO BASE STATION INFORMATION IN THE P1 POINT

| RADIO MOBILE STATION | POSITION (LATITUDE/LONGITUDE) | P1 POINT | TRAVEL DIRECTION | TRAVEL VELOCITY |
|---|---|---|---|---|
| | X10° X20' X30" /Y10° Y20' Y30" | | EAST | 300km/h |

| RADIO BASE STATION | POSITION (LATITUDE/LONGITUDE) | DISTANCE FROM RADIO MOBILE STATION | DIRECTION FROM RADIO MOBILE STATION | DOWNLINK COMMUNICATIONS QUALITY | COMMUNICATION STATE |
|---|---|---|---|---|---|
| A | X1° X2' X3" /Y1° Y2' Y3" | a[m]: SHORT DISTANCE | NORTHEAST | GOOD | ENGAGED IN COMMUNICATION |
| B | X4° X5' X6" /Y4° Y5' Y6" | b[m]: MEDIUM DISTANCE | EAST-NORTHEAST | FAIR | MONITORING |
| C | X1° X2' X3" /Y7° Y8' Y9" | c[m]: LONG DISTANCE | SOUTHEAST | POOR | MONITORING |

→ PREDICTION (PREDICTION OF TRAVEL TOWARD P3 POINT)

PREDICTED RADIO MOBILE STATION INFORMATION AND PERIPHERAL RADIO BASE STATION INFORMATION IN THE P3 POINT

| RADIO MOBILE STATION | PREDICTED POSITION (LATITUDE/LONGITUDE) P3 POINT | TRAVEL DIRECTION | TRAVEL VELOCITY |
|---|---|---|---|
| | X11° X22' X33" /Y11° Y22' Y33" | EAST | 300km/h |

| RADIO BASE STATION | POSITION (LATITUDE/LONGITUDE) | DISTANCE FROM RADIO MOBILE STATION | DIRECTION FROM RADIO MOBILE STATION | DOWNLINK COMMUNICATIONS QUALITY | COMMUNICATION STATE |
|---|---|---|---|---|---|
| A | X1° X2' X3" /Y1° Y2' Y3" | e[m]: LONG DISTANCE | SOUTHWEST | POOR | - |
| B | X4° X5' X6" /Y4° Y5' Y6" | f[m]: MEDIUM DISTANCE | NORTHWEST | FAIR | - |
| C | X1° X2' X3" /Y7° Y8' Y9" | g[m]: SHORT DISTANCE | NORTH | GOOD | - |

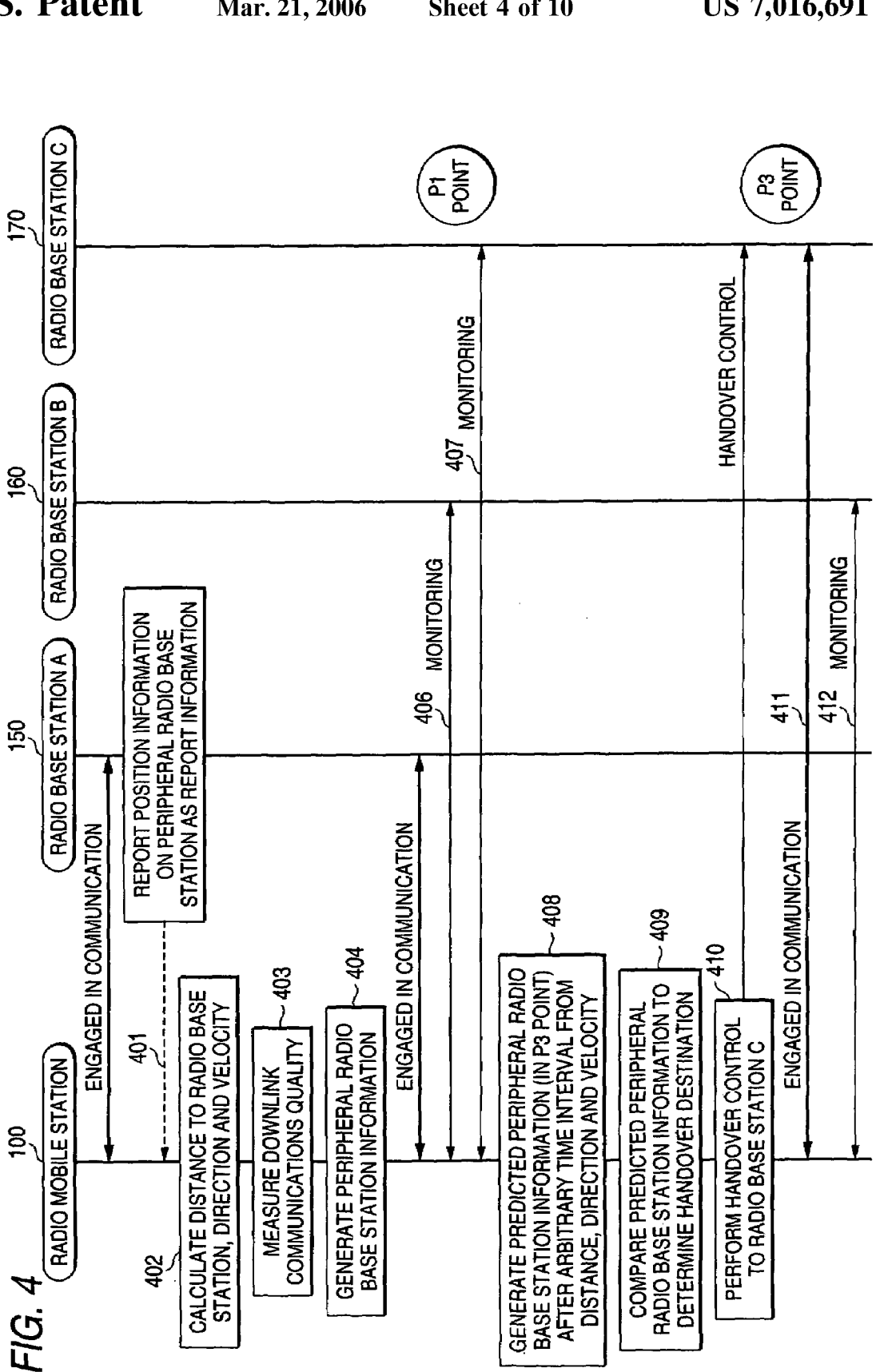

FIG. 7A  RADIO MOBILE STATION INFORMATION AND PERIPHERAL RADIO BASE STATION INFORMATION IN CASE RADIO BASE STATIONS ARE DENSELY POPULATED, FOR EXAMPLE, IN AN URBAN AREA

| | POSITION (LATITUDE/LONGITUDE) | TRAVEL DIRECTION | TRAVEL VELOCITY |
|---|---|---|---|
| RADIO MOBILE STATION | X10° X20′ X30″ /Y10° Y20′ Y30″ | ARBITRARY | LOW |

| RADIO BASE STATION | POSITION (LATITUDE/LONGITUDE) | DISTANCE FROM RADIO MOBILE STATION | DIRECTION FROM RADIO MOBILE STATION | DIRECTION FROM RADIO MOBILE STATION | COMMUNICATION STATE |
|---|---|---|---|---|---|
| A | X1° X2′ X3″ /Y1° Y2′ Y3″ | SHORT DISTANCE | NORTHWEST | GOOD (STABLE) | ENGAGED IN COMMUNICATION |
| B | X4° X5′ X6″ /Y4° Y5′ Y6″ | SHORT DISTANCE | NORTHEAST | GOOD (STABLE) | MONITORING |
| C | X1° X2′ X3″ /Y7° Y8′ Y9″ | SHORT DISTANCE | SOUTH | GOOD (STABLE) | MONITORING |

AREA PREDICTION = "URBAN AREA"

| PARAMETER CONTROL | | |
|---|---|---|
| HANDOVER PARAMETER | REPORT WAIT TIME (TIME-TO-TRIGGER) | EXTENDED |
| | HANDOVER EVENT REPORT RANGE (HYSTERESIS) | NARROWED |
| SENDING POWER TO RADIO MOBILE STATION | | DECREASED |

FIG. 8B  RADIO MOBILE STATION INFORMATION AND PERIPHERAL RADIO BASE STATION INFORMATION IN CASE RADIO BASE STATIONS ARE SPARSELY POPULATED, FOR EXAMPLE, IN A SUBURBAN AREA, DURING A HIGH-SPEED TRAVEL ON A HIGHWAY OR SHINKAN-SEN TRAIN

| | POSITION (LATITUDE/LONGITUDE) | TRAVEL DIRECTION | TRAVEL VELOCITY |
|---|---|---|---|
| RADIO MOBILE STATION | X10° X20' X30" /Y10° Y20' Y30" | ARBITRARY | MEDIUM TO HIGH |

| RADIO BASE STATION | POSITION (LATITUDE/LONGITUDE) | DISTANCE FROM RADIO MOBILE STATION | DIRECTION FROM RADIO MOBILE STATION | DIRECTION FROM RADIO MOBILE STATION | COMMUNICATION STATE |
|---|---|---|---|---|---|
| A | X1° X2' X3" /Y1° Y2' Y3" | LONG DISTANCE | NORTHWEST | POOR (UNSTABLE) | ENGAGED IN COMMUNICATION |
| B | X4° X5' X6" /Y4° Y5' Y6" | LONG DISTANCE | NORTHEAST | POOR (UNSTABLE) | MONITORING |
| C | X1° X2' X3" /Y7° Y8' Y9" | LONG DISTANCE | SOUTH | POOR (UNSTABLE) | MONITORING |

AREA PREDICTION = "SUBURBAN AREA" OR "HIGH-SPEED TRAVEL"

| | | PARAMETER CONTROL |
|---|---|---|
| HANDOVER PARAMETER | REPORT WAIT TIME (TIME-TO-TRIGGER) | REDUCED |
| | HANDOVER EVENT REPORT RANGE (HYSTERESIS) | EXTENDED |
| SENDING POWER TO RADIO MOBILE STATION | | INCREASED |

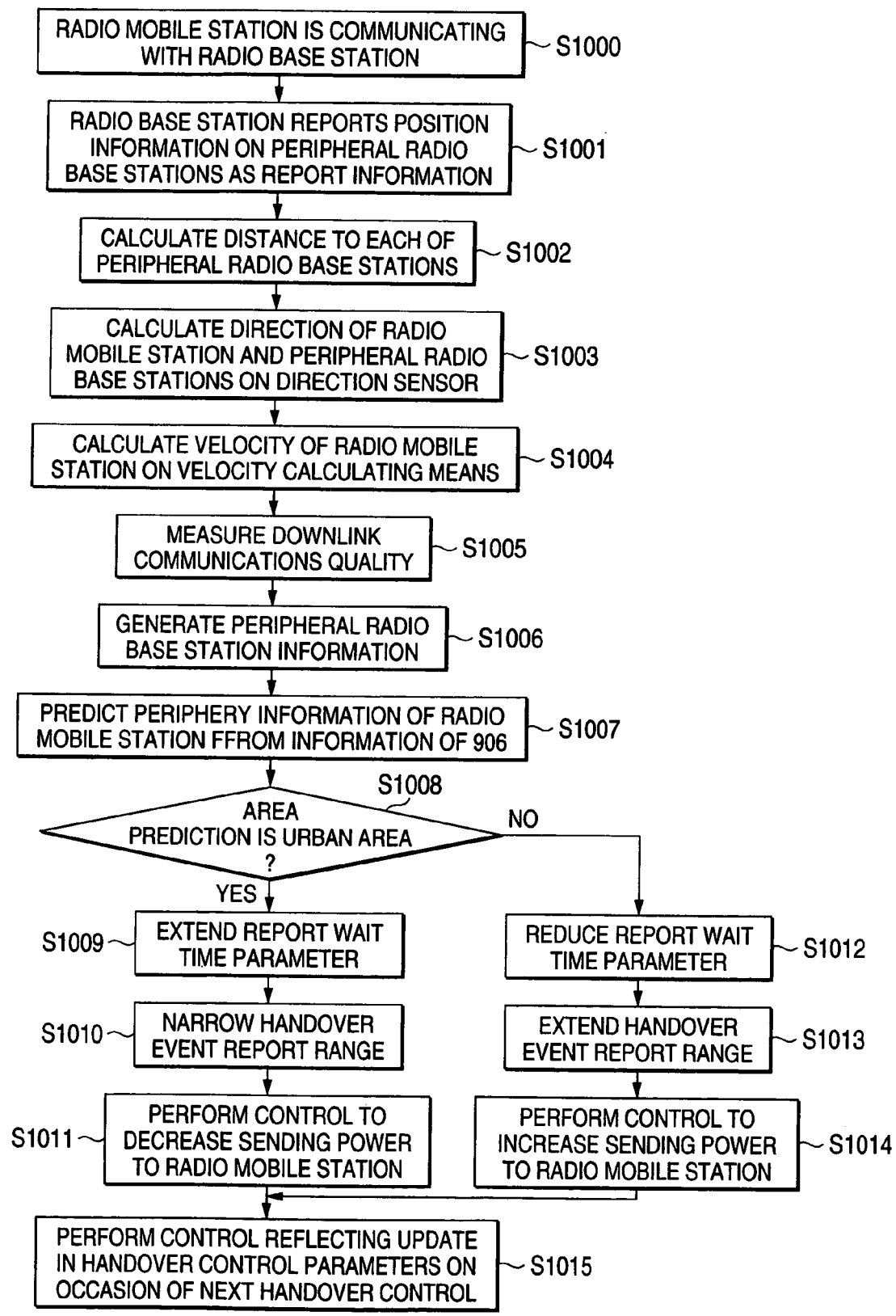

MOBILE TELECOMMUNICATIONS SYSTEM AND A MOBILE TELECOMMUNICATIONS CONTROL METHOD

BACKGROUND OF THE INVENTION

1. Field of the Invention

The present invention relates to a mobile telecommunications system and a mobile telecommunications control method using a radio mobile station such as a cell phone and in particular to handover control for switching a radio base station to communicate with the radio mobile station.

2. Description of the Related Art

In a related art mobile telecommunications system, in case handover control is made while a radio mobile station is communicating with a radio base station to switch over to communications with another radio base station, a downlink spread code to identify the radio wave direction (sector) of a radio base station called the scramble code in the report information from the radio base station engaged in communications is given as peripheral radio base station information to the radio mobile station. The radio mobile station measures the downlink communications quality of this spread code to determine the radio base station as a handover destination. On top of this related art method, handover control using position information obtained from the GPS has been disclosed (refer to the Japanese Patent Laid-Open No. 2002-199428, Page 5, FIG. 2).

In the related art mobile telecommunications system, in case a radio mobile station performs handover control, a downlink spread code (scramble code) in the information reported from the radio base station engaged in communications is given to the radio mobile station. The radio mobile station performs handover control based on the downlink communications quality corresponding to the spread code. However in case the radio mobile station travels at a high-speed on a highway or Shinkan-sen train, handover control which is based on the downlink communications quality causes the communications quality of an adjacent radio base station to vary drastically, which increases the handover control count. Due to a high-speed travel of the radio mobile station, handover control using ordinary handover control parameters generates a time lag in the handover control timing thus blocking the control data for radio telecommunications and releasing the ongoing call.

SUMMARY OF THE INVENTION

The invention has been accomplished to solve the problem and aims at providing a mobile telecommunications system and a mobile telecommunications control method which regulate the unnecessary handover control count and reduce the power consumption of a radio mobile station thereby reducing the load on the radio telecommunications system to maintain stable communications.

In order to solve the problem, the invention provides the following means:

A first aspect of the invention is a mobile telecommunications system comprising: a plurality of radio base stations; and a radio mobile station which communicates with one of the radio base stations via a radio channel; characterized in that the radio mobile station comprises: communications quality detecting means for detecting the quality of downlink communications with the radio base station; position information detecting means for detecting position information on the radio mobile station; distance calculating means for calculating the distance from the radio mobile station to the radio base station; travel direction detecting means for detecting the travel direction of the radio mobile station; travel velocity detecting means for detecting the velocity of the radio mobile station; position predicting means for predicting the position of the radio mobile station assumed after an arbitrary time interval based on the detected distance to the radio base station, travel direction of the radio mobile station and velocity of the radio mobile station; information generating means for calculating the distance to each radio base station, travel direction of the radio mobile station, velocity of the radio mobile station and downlink communications quality of each radio base station in the predicted position and assumes the information obtained as peripheral radio base station information; handover destination determining means for determining a radio base station as a handover destination based on the calculated distance to each radio base station and downlink communications quality of each radio base station in the peripheral radio base station information; and handover control means for performing handover control with the determined radio base station as a handover destination.

According to this configuration, a radio mobile station performs handover control based on the distance to and communications quality of a peripheral radio base station in the predicted position of the radio mobile station after an arbitrary time interval. This regulates the unnecessary handover control count and reduces the power consumption of the radio mobile station thereby reducing the load on the radio telecommunications system to maintain stable communications.

A second aspect of the invention is the mobile telecommunications system according to the first aspect of the invention, characterized in that the position information detecting means receives positioning information from GPS satellites to calculate the information on its own position.

A third aspect of the invention is the mobile telecommunications system according to the first aspect of the invention, characterized in that the travel direction detecting means calculates the travel direction of the radio mobile station based on a direction identification sensor and the state of radio communications with a radio base station.

A fourth aspect of the invention is the mobile telecommunications system according to the first aspect of the invention, characterized in that the travel velocity detecting means uses the positioning information from GPS satellites and radio communications state information to calculate the velocity of the radio mobile station.

A fifth aspect of the invention is the mobile telecommunications system according to the first aspect of the invention, characterized in that the radio base station has a feature to previously store the information on the radio base station and information on the peripheral radio base stations and comprises position information report means for reporting the position information on the radio base station and the peripheral radio base stations to the radio mobile station as report information.

A sixth aspect of the invention is the mobile telecommunications system according to the fifth aspect of the invention, characterized in that the distance calculating means uses the position information on the radio mobile station detected by the position information detecting means and the report information from the position information report means to calculate the distance to a peripheral radio base station.

A seventh aspect of the invention is the mobile telecommunications system according to the first aspect of the invention, characterized in that the handover destination determining means compares the distances to the radio base stations in the predicted peripheral radio base station information and the downlink communications qualities of the radio base stations and determines as a handover destination the radio base station which is the closest to the radio mobile station and which best improves the downlink communications quality.

An eighth aspect of the invention is the mobile telecommunications system according to the first aspect of the invention, characterized in that the handover control means changes the handover control parameter values based on the peripheral radio base station density calculated from the peripheral radio base station information and performs handover control.

A ninth aspect of the invention is the mobile telecommunications system according to the first aspect of the invention, characterized in that the handover control means changes the sending power to the radio mobile station based on the peripheral radio base station density calculated from the peripheral radio base station information and performs handover control.

A tenth aspect of the invention is a mobile telecommunications control method for the mobile telecommunications system comprising: a plurality of radio base stations; and a radio mobile station which communicates with one of the radio base stations via a radio channel; characterized in that the method comprises the steps of: predicting the position of the radio mobile station assumed after an arbitrary time interval; calculating the distance to each radio base station, travel direction of the radio mobile station, velocity of the radio mobile station and downlink communications quality of each radio base station in the predicted position; determining a radio base station as a handover destination based on the calculated distance to each radio base station, velocity of the radio mobile station and downlink communications quality of each radio base station; and performing handover control with the determined radio base station as a handover destination.

According to this configuration, handover control is performed based on the distance to and communications quality of a peripheral radio base station in the predicted position of the radio mobile station after an arbitrary time interval. This regulates the unnecessary handover control count and reduces the power consumption of the radio mobile station thereby reducing the load on the radio telecommunications system to maintain stable communications.

An eleventh aspect of the invention is a mobile telecommunications control program, characterized in that the program causes a computer to implement: a feature to detect the downlink communications quality in the communications between a radio base station and a radio mobile station; a feature to detect the position information on the radio mobile station; a feature to calculate the distance from the radio mobile station to the radio base station; a feature to detect the travel direction of the radio mobile station; a feature to detect the velocity of the radio mobile station; a feature to predict the position of the radio mobile station assumed after an arbitrary time interval based on the calculated distance to the radio base station, travel direction of the radio mobile station and velocity of the radio mobile station; a feature to calculate the distance to each radio base station, travel direction of the radio mobile station, velocity of the radio mobile station and downlink communications quality of each radio base station in the predicted position and assume the information obtained as peripheral radio base station information; a feature to determine a radio base station as a handover destination based on the calculated distance to each radio base station and downlink communications quality of each radio base station in the peripheral radio base station information; and a feature to change the handover control parameter values and sending power to the radio mobile station based on the peripheral radio base station density calculated from the peripheral radio base station information and performs handover control with the determined radio base station as a handover destination.

According to this configuration, handover control is performed based on the distance to and communications quality of a peripheral radio base station in the predicted position of the radio mobile station after an arbitrary time interval. This regulates the unnecessary handover control count and reduces the power consumption of the radio mobile station thereby reducing the load on the radio telecommunications system to maintain stable communications.

BRIEF DESCRIPTION OF THE DRAWINGS

FIG. 3 shows the predicted radio mobile station information and the peripheral radio base station information on the radio mobile station according to the first embodiment in the predicted destination point after an arbitrary time interval;

FIG. 4 is a sequence diagram illustrating the radio communications operation of the mobile telecommunications system shown in the first embodiment;

FIG. 7 shows the radio mobile station information and peripheral radio base station information obtained in case radio base stations on the periphery of the radio mobile station according to the second embodiment are densely populated;

FIG. 8 shows the radio mobile station information and peripheral radio base station information obtained in case radio base stations on the periphery of the radio mobile station according to the second embodiment are sparsely populated;

FIG. 10 is a flowchart showing the handover timing of a radio mobile station according to the second embodiment.

DESCRIPTION OF THE PREFERRED EMBODIMENTS

Figure 1:
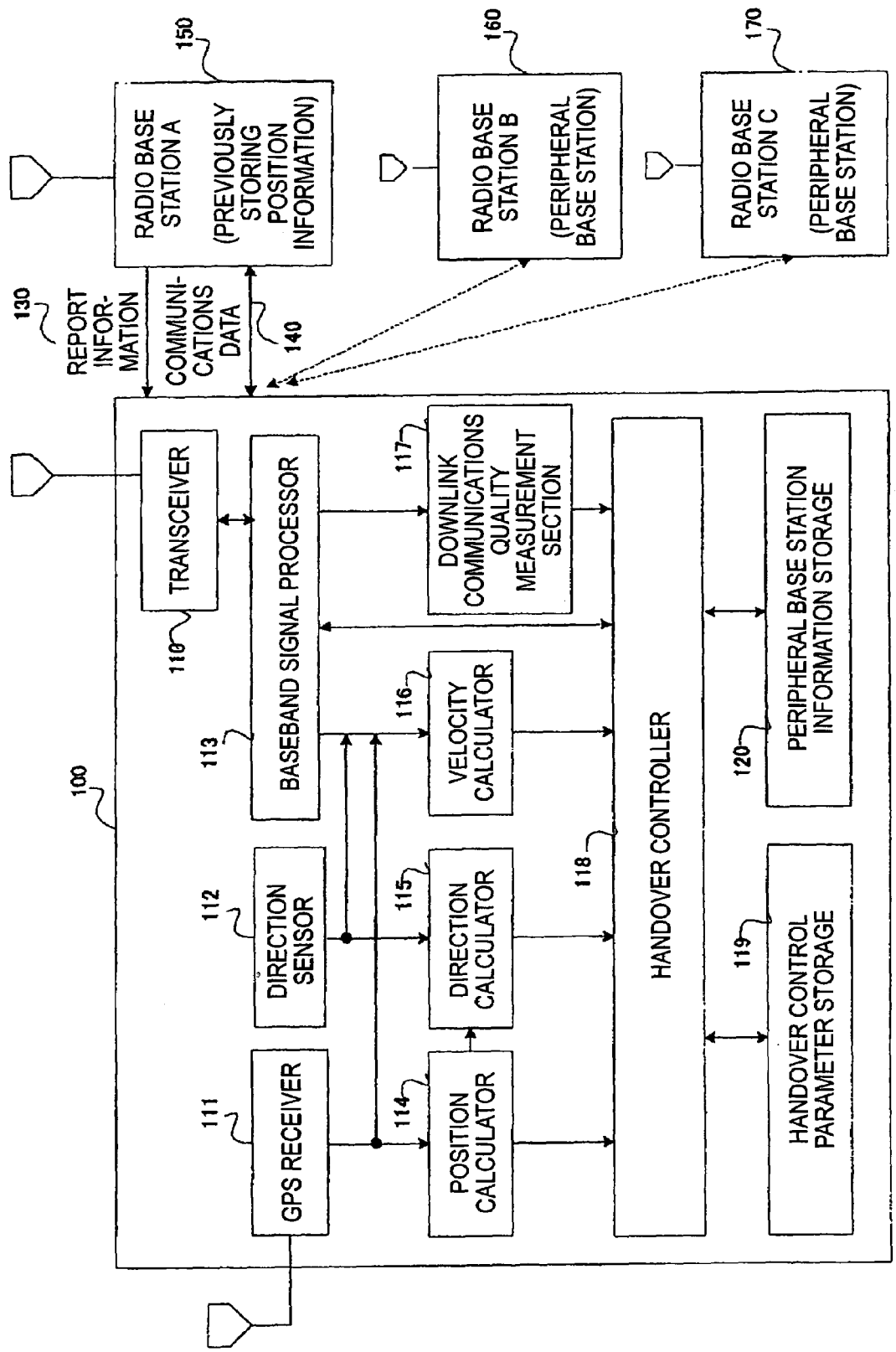
FIG. 1 is a block diagram of a radio mobile station in a mobile telecommunications system according to a first embodiment of the invention.

Embodiments of the invention will be described referring to the drawings.

(First Embodiment)

FIG. 1 is a block diagram of a radio mobile station in a mobile telecommunications system according to a first embodiment of the invention. In FIG. 1, a radio mobile station 100 comprises a transceiver 110, a GPS receiver 111, a direction sensor 112, a baseband signal processor 113, a position calculator 114, a direction calculator 115, a velocity calculator 116, a downlink communications quality measurement section 117, a handover controller 118, a handover control parameter storage 119, and a peripheral base station information storage 120.

The radio mobile station 100 of this configuration transmits/receives report information 130 and communications data 140 to/from a radio base station 150, a radio base station 160 or a radio base station 170.

Operation of this embodiment is described below. While the radio mobile station 100 is communicating with the radio base station 150 or awaiting a call from the radio base station 150, the radio base station 150 transmits the position information on the radio base station and the peripheral radio base stations by way of the report information 130. The radio mobile station 100 receives the report information 130 on the transceiver 110. The received signal undergoes signal processing by the baseband signal processor 113 and is input to the downlink communications quality measurement section 117, where the downlink communications quality is calculated.

The position calculator 114 calculates the position of the radio mobile station 100 based on the signal received by the GPS receiver 111 and calculates the distances from the radio mobile station 100 to the radio base station 150, radio base station 160, and radio base station 170 based on the calculated position information and the report information 130. The direction calculator 115 calculates the travel direction of the radio mobile station based on the direction information detected by the direction sensor 112, position information on the radio mobile station 100 received from the position calculator 114, and the report information.

The velocity calculator 116 calculates the travel velocity of the radio mobile station 100 based on the information received by the GPS receiver 111, direction information from the direction sensor, and a report information signal obtained by converting the report information 130 to a baseband signal by way of the baseband signal processor 113. The downlink communications quality measurement section 117 measures the downlink communications quality by way of the report information signal in the baseband.

The handover controller 118 inputs the distance, direction, velocity and downlink communications quality from the position calculator 114, direction calculator 115, velocity calculator 116, and downlink communications quality measurement section 117 respectively, and stores the information into the peripheral base station information storage 120 per peripheral base station. The handover controller 118 also calculates the predicted position after an arbitrary time interval and peripheral base station information and performs handover control in accordance with the parameters from the handover control parameter storage 119.

Figure 2A:
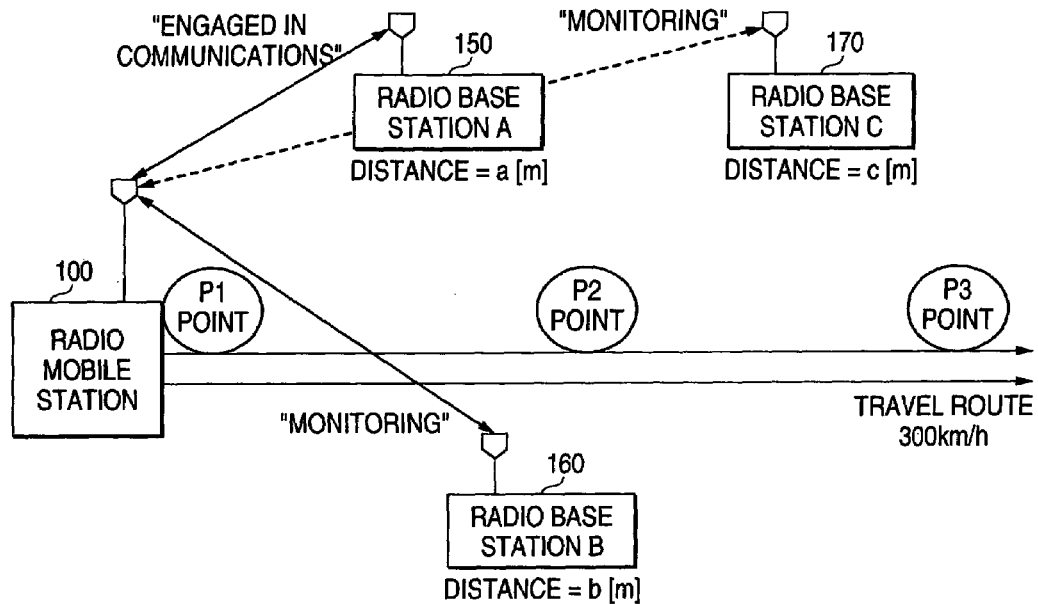
FIG. 2 shows an exemplary arrangement of a radio mobile station and radio base stations in a mobile telecommunications system according to the first embodiment.
Figure 2B:
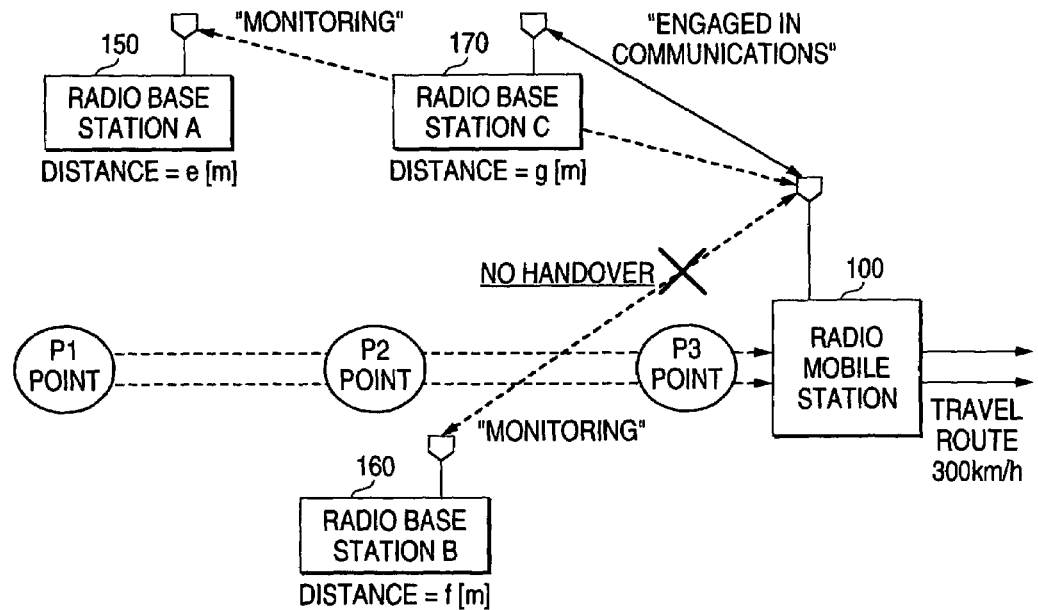

FIG. 2 shows an exemplary arrangement of a radio mobile station and radio base stations in a mobile telecommunications system according to the first embodiment of the invention. As shown in FIG. 2, it is assumed that the radio mobile station 100 is traveling through a P1 point and the radio mobile station will pass through a travel route connecting a P" point and a P3 point. FIG. 2A shows the radio communication state in the P1 point. FIG. 2B shows the predicted radio communication state in the P3 point as a predicted destination point after an arbitrary time interval. The radio mobile station 100 traveling through the P1 point and is communicating with the radio base station 150. The radio base station 160 and the radio base station 170 are in monitor communications where the downlink communications quality is being measured.

The upper half of FIG. 3 shows the radio mobile station information and the peripheral radio base station information. The lower half of FIG. 3 shows the predicted radio mobile station information and peripheral radio base station information in the P3 point as a predicted destination point after an arbitrary time interval. The upper half of FIG. 3 shows the position of each of the radio base stations 150, 160, 170, the distance from the radio mobile station 100 to each of the radio base stations 150, 160, 170, the direction of each of the radio base stations 150, 160, 170 from the radio mobile station 100, and the downlink communications quality information respectively stored into the peripheral base station information storage 120 by the radio mobile station 100 based on the information from the position calculator 114, direction calculator 115, velocity calculator 116, and downlink communications quality measurement section 117.

The lower half of FIG. 3 shows the calculation result which is based on the radio mobile station information and the peripheral radio base station information predicted from the radio mobile station information and the peripheral radio base station information in the P1 point shown in the upper half of FIG. 3 assuming that the destination point after an arbitrary time interval is the P3 point.

The radio mobile station 100 performs control to determine the radio base station 170 as a next handover destination based on the predicted information. Arrangement of the radio mobile station 100 in the P3 point and the radio base stations 150, 160, 170 is shown in FIG. 2B.

Figure 5:
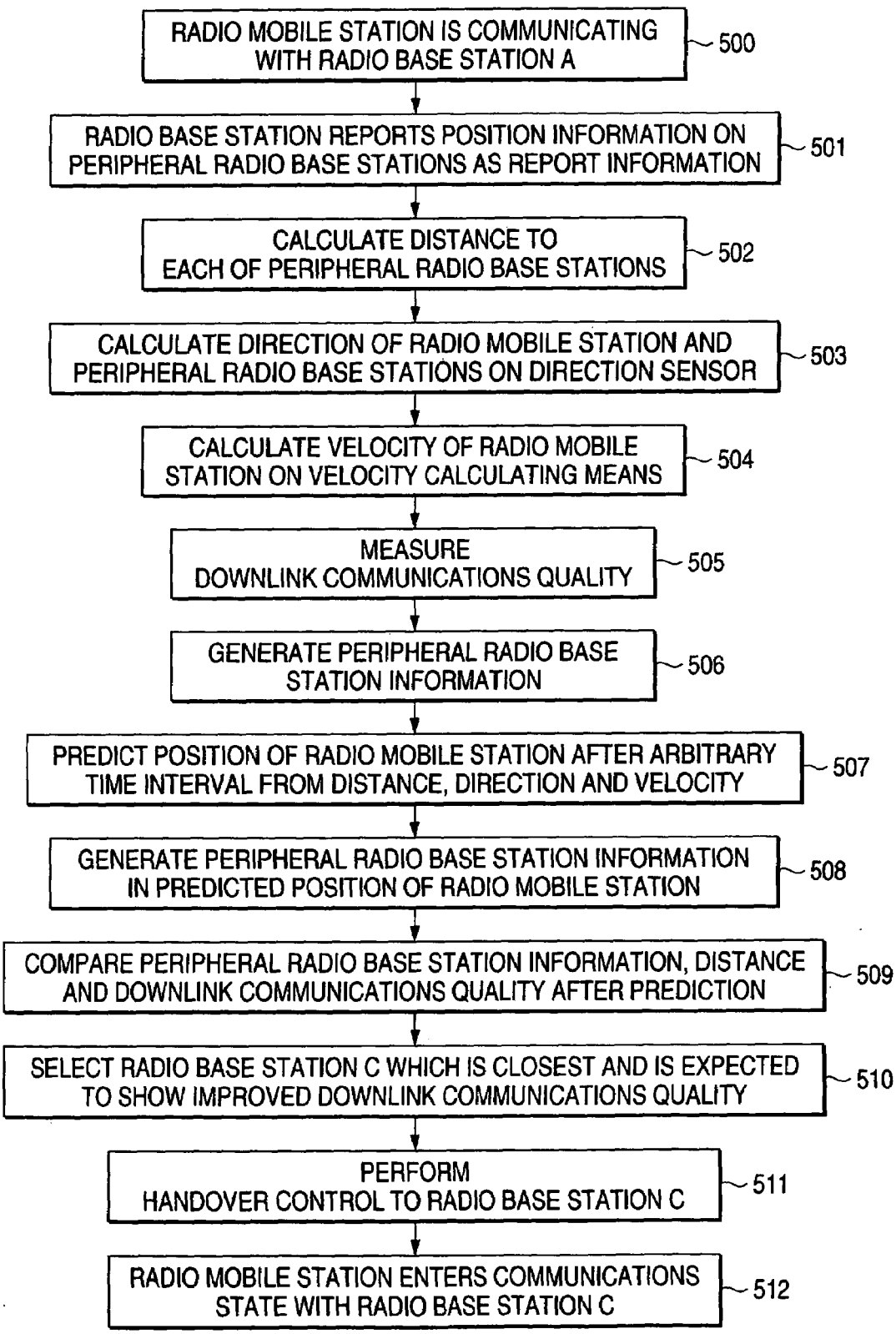
FIG. 5 is a flowchart of the radio communications operation procedure of the mobile telecommunications system show in the first embodiment.

FIG. 4 is a sequence diagram illustrating the radio communications operation of the mobile telecommunications system shown in the first embodiment. FIG. 5 is a flowchart of the radio communications operation procedure of the mobile telecommunications system. The steps in the sequence of FIG. 4 are shown in four hundreds. The steps in the flowchart of FIG. 5 are shown in five hundreds.

In step 500, the radio mobile station 100 is communicating with the radio base station 150 (step 400). In step 501, the radio base station 150 reports the position information on the peripheral radio base stations as report information 130 to the radio mobile station 100 (step 401) with an arbitrary timing. Note that the radio base station 150 has previously stored the information on the radio base station 150 and the peripheral radio base stations.

In step 502, the radio mobile station 100 calculates the distance from the radio mobile station 100 to each of the peripheral radio base stations 150, 160, 170 based on the received report information 130 and the position information from the GPS receiver 111. In step 503, the radio mobile station 100 calculates the direction of the radio mobile station 100 and each of the peripheral radio base stations 150, 160, 170 on the direction sensor 112. In step 504, the radio mobile station 100 calculates the velocity of the radio mobile station 100 on the velocity calculator 116 (step 402). Next, in step 505, the radio mobile station 100 measures the downlink communications quality of each of the radio base station 150 engaged in communications and the peripheral radio base stations 160, 170 on the downlink communications quality measurement section 117 (step 403).

In step 506, the radio mobile station 100 generates peripheral radio base station information based on the calculated distance, direction, velocity and downlink communications quality (step S404). In step 507, the radio mobile station 100 predicts the position of the radio mobile station 100 after an arbitrary time interval from the parameters of the distance, direction and velocity in the peripheral radio base station information.

In the meantime, the radio mobile station 100 is communicating with the radio base station 150 (step 405) and monitoring the communications with the radio base stations 160, 170 (step 406, 407).

In step 508, the radio mobile station 100 calculates the peripheral radio base station information in the predicted position of the radio mobile station 100 to generate peripheral radio base station information (step 408). Further, in step 509, the radio mobile station 100 compares the distances to and downlink communications qualities of the radio base stations in the predicted peripheral radio base station information calculated.

In step 509, the radio mobile station 100 determines a radio base station which is the closest to the radio mobile station 100 and is assumed to show improved communications quality, for example the radio base station 170, as a handover-to radio base station (step 409). In step 510, the radio mobile station 100 performs handover control with the radio base station 170 (step 410).

In step 511, the radio mobile station 100 completes handover control. In step 512, the radio mobile station 100 enters the state of communications with the radio base station 10 (step 411). The radio mobile station 100 also performs monitor communications with the radio base station 160 (step 412).

According to this embodiment, handover control is performed by predicting the radio communications state of the radio mobile station 100 in the predicted destination point after an arbitrary time interval. This regulates the unnecessary handover control count and reduces the load on the entire radio telecommunications system as well as improves stable communications during handover control while the radio mobile station 100 is traveling at a high-speed. As the handover count is decreased, the power consumption of the radio mobile station 100 is reduced.

(Embodiment 2)

Figure 6A:
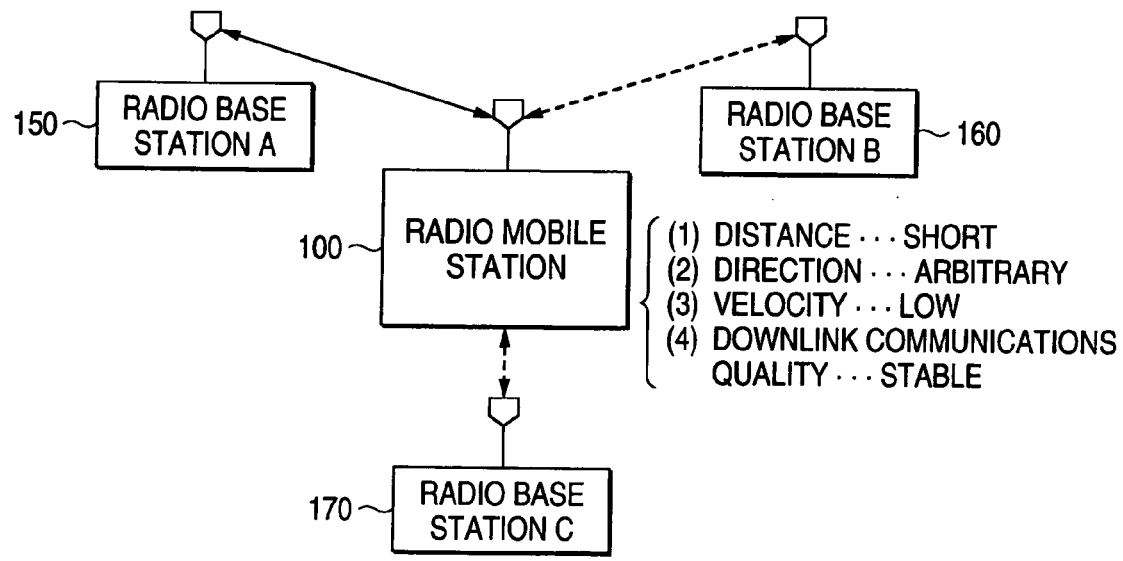
FIG. 6 shows arrangements of a radio mobile station and radio base stations in a mobile telecommunications system according to the second embodiment of the invention.
Figure 6B:
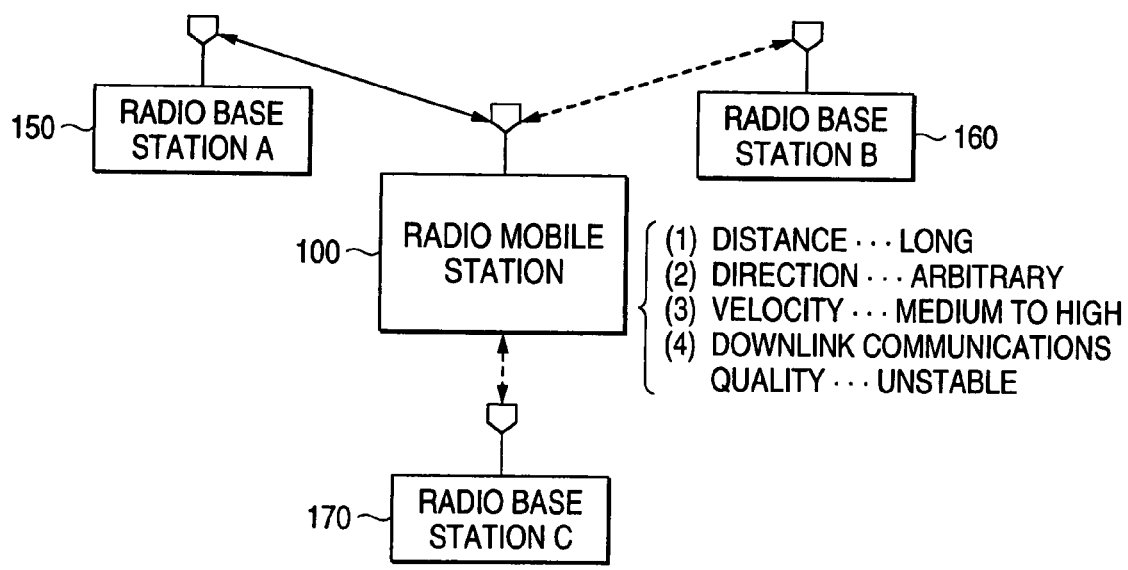

FIG. 6 shows arrangements of a radio mobile station and radio base stations in a mobile telecommunications system according to the second embodiment of the invention. FIG. 6A shows an exemplary arrangement where radio base stations are densely populated, for example, in an urban area. FIG. 6B shows an exemplary arrangement where radio base stations are sparsely populated, for example, in a suburban area, during a high-speed travel on a highway or Shinkan-sen train. Note that this configuration is similar to the first embodiment mentioned earlier. Thus, in the following description, operation of the same components will not be described. Only the operation specific to this configuration is described below.

As shown in FIG. 6, this embodiment assumes a case where handover control take place while the radio mobile station 100 is traveling through either of the characteristic locations noted above. The upper half of FIG. 7 shows the radio mobile station information and peripheral radio base station information obtained in case radio base stations are densely populated, for example in an urban area. In case the radio mobile station 100 is traveling at a low speed and the distance to each of the peripheral radio base stations 150 through 170 is short so that the downlink communications quality is stable, the handover controller 118 assumes the "urban area". Control is made so that the report wait time will be extended and the handover event report range will be narrowed as shown in the lower half of FIG. 7 to decrease the sending power to the radio mobile station 100.

The upper half of FIG. 8 shows the radio mobile station information and peripheral radio base station information obtained in case peripheral radio base stations are sparsely populated, for example, in a suburban area, during a high-speed travel on a highway or Shinkan-sen train. In case the radio mobile station 100 is traveling at a medium to high speed and the distance to each of the peripheral radio base stations is long so that the downlink communications quality is unstable, the handover controller 118 assumes the "suburban area" or "high-speed travel". Control is made so that the report wait time will be reduced and the handover event report range will be extended as shown in the lower half of FIG. 8 to increase the sending power to the radio mobile station 100.

Figure 9A:
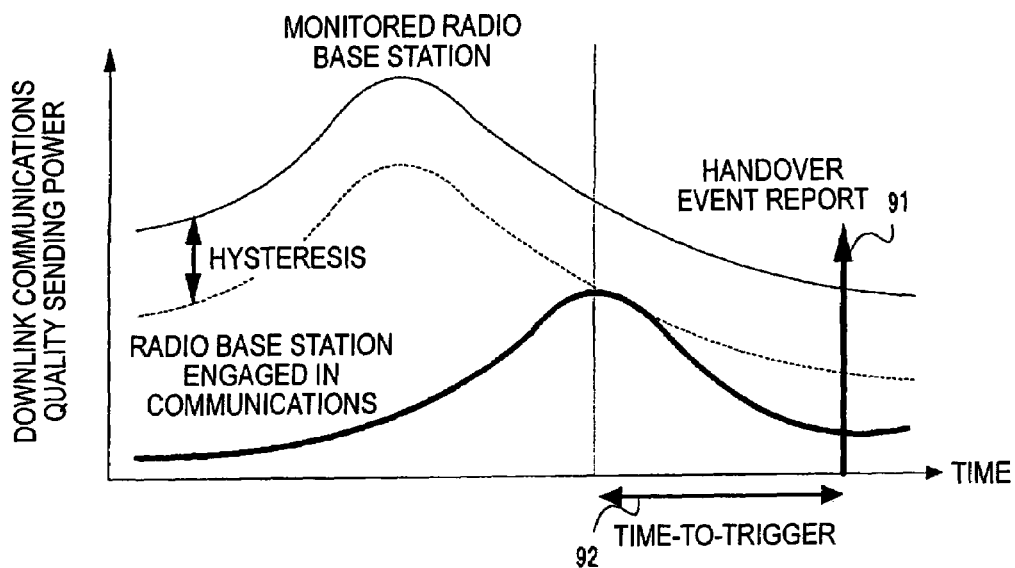
FIG. 9 are waveform diagrams showing the handover control timings for a case where radio base stations on the periphery of the radio mobile station according to the second embodiment are densely populated and for a case where the radio base stations are sparsely populated.
Figure 9B:
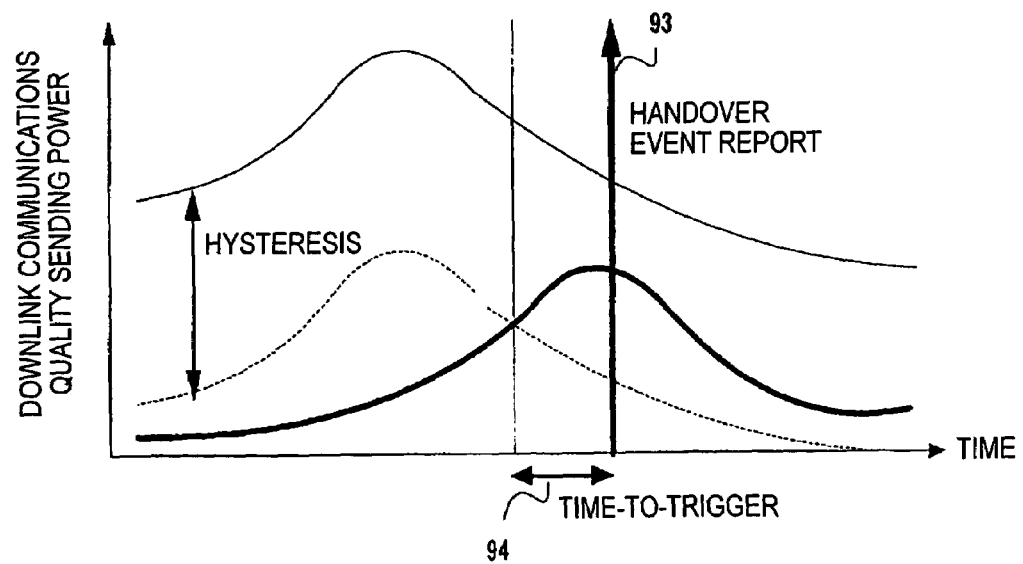

FIG. 9A shows a handover control timing diagram for a case where radio base stations are densely populated, for example in an urban area. FIG. 9B shows a handover control timing diagram for a case where peripheral radio base stations are sparsely populated, for example, in a suburban area, during a high-speed travel on a highway or Shinkan-sen train. In the example of FIG. 9A, peripheral radio base stations are densely populated so that the handover event report range is narrowed to reduce the event reports as shown by a numeral 91. The report wait time is extended to extend the time interval between event reports so as to suppress unnecessary handover event reports as shown by a numeral 92. At the same time, the sending power to the radio mobile station 100 is decreased to reduce the power consumption of the radio mobile station 100.

In the example of FIG. 9B, peripheral radio base stations are sparsely populated so that the handover event report range is extended to increase the event reports as shown by a numeral 93. The report wait time is reduced to narrow the time interval between event reports as shown by a numeral 94. At the same time, the sending power to the radio mobile station 100 is increased to reduce possible call disconnections in this area.

FIG. 10 is a flowchart showing the handover timing of a radio mobile station according to this embodiment under the conditions given in FIG. 9. In step 1000, the radio mobile station 100 is communicating with a radio base station, for example a radio base station 150. In step 1001, the radio base station reports the position information on the peripheral radio base stations as report information 130 to the radio mobile station 100 with an arbitrary timing. Note that the radio base stations 150 through 170 have previously stored the information on the radio base stations 150 through 170 and the peripheral radio base stations.

In step 1002, the radio mobile station 100 calculates the distance from the radio mobile station 100 to each of the peripheral radio base stations by way of the report information 130 and the position calculator 114 using the GPS. In step 1003, the radio mobile station 100 calculates the direction of the radio mobile station 100 and each of the peripheral radio base stations on the direction calculator 115. In step 1004, the radio mobile station 100 calculates the velocity of the radio mobile station 100 on the velocity calculator 116. Next, instep 1005, the radio mobile station 100 measures the downlink communications quality of the radio mobile station 100 engaged in communications and each of the radio base stations 150 through 170 on the downlink communications quality measurement section 117. In step 1006, the radio mobile station 100 generates peripheral radio base station information based on the information including the calculated distance, direction, velocity and downlink communications quality.

In step 1007, the radio mobile station 100 predicts the situation of the radio base stations on the periphery of the radio mobile station 100 based on the peripheral radio base station information. In step 1008, the radio mobile station 100 determines whether the periphery of the radio mobile station 100 is an urban area. In case the prediction result is an urban area, the radio mobile station 100 executes the processing of step 1009. In case it is a suburban area, the radio mobile station 100 executes the processing of step 1012.

In case the prediction result is an urban area, the radio mobile station 100 increases the value in the report wait time parameter as a handover control parameter in step 1009. The radio mobile station decreases the value in the handover event report range parameter as a handover control parameter in step 1010. The radio mobile station 100 then performs control to decrease the sending power to the radio mobile station 100 in step 1011.

In case the prediction result is a suburban area, the radio mobile station 100 decreases the value in the report wait time parameter as a handover control parameter in step 1012. The radio mobile station increases the value in the handover event report range parameter as a handover control parameter in step 1013. The radio mobile station 100 then performs control to increase the sending power to the radio mobile station 100 in step 1014.

In step 1015, the radio mobile station 100 performs control reflecting an update in the handover control parameters on the occasion of next handover control.

According to this embodiment, it is possible to perform handover control so that the handover control parameters and the sending power to the radio mobile station 100 will be modified depending on the area-based radio base station environment. This makes it possible to perform high-accuracy with reduced risks of an ongoing call being disconnected. It is also possible to reduce the load on the entire radio telecommunications system and reduce the power consumption of the radio mobile station 100.

The operation of the embodiments may be implemented by programming the operation and causing a computer to execute the program. In this practice, the computer program may be supplied to a computer via a variety of program recording media such as disk-based recording medium including a floppy disk® and a hard disk, memories such as a semiconductor memory and a card-type memory, or a communications network.

By executing high-accuracy handover control with reduced call disconnections and radio telecommunications control to reduce the power consumption of a radio mobile station by way of a program, complicated but flexible radio telecommunications control is made available. Even in case the specification for a mobile telecommunications system has been amended, a flexible design change is allowed. In case the program on a non-volatile recording medium must be overwritten due to a design change, the user can overwrite the program a desired number of times.

As mentioned hereinabove, according to the invention, by performing handover control based on the distance to and communications quality of each of the peripheral radio base stations in the predicted position of a radio mobile station after an arbitrary time interval, it is possible to regulate the unnecessary handover control count and reduce the power consumption of a radio mobile station thereby reducing the load on the radio telecommunications system to maintain stable communications.

By changing the handover control parameter values or sending power depending on the density of the radio base stations on the periphery of a radio mobile station, it is possible to perform high-accuracy handover control which reduces possible call disconnections during handover control caused by a shadowing phenomenon in an urban area.

What is claimed is:

1. A mobile telecommunications system comprising:
   a plurality of radio base stations; and
   a radio mobile station, which communicates with one of the radio base stations via a radio channel;
   wherein the radio mobile station comprises:
   a position information detector, which detects a current position on the radio mobile station;
   a communications quality detector, which detects qualities of downlink communications of the respective radio base stations at the current position;
   a distance calculator, which calculates distances from the radio mobile station to the radio base stations at the current position;
   a travel direction detector, which detects a travel direction of the radio mobile station at the current position;
   a travel velocity detector, which detects a velocity of the radio mobile station at the current position;
   a position predictor, which predicts a position of the radio mobile station after an arbitrary time interval is elapsed, based on the travel direction and the velocity;
   an information generator, which generates peripheral radio base station information, including the distances from the radio mobile station to respective radio base stations at the predicted position, and downlink communications qualities of respective radio base stations at the predicted position;
   handover destination determinant, which determines one radio base station among the base stations as a handover destination, based on the calculated distances to respective radio base stations and downlink communications qualities of respective radio base stations in the peripheral radio base station information; and
   handover controller, which performs a handover control with the radio base station determined by the handover destination determiner.

2. The mobile telecommunications system according to claim 1, wherein the position information detector receives positioning information from GPS satellites to calculate the information on its own position.

3. The mobile telecommunications system according to claim 1, wherein the travel direction detector calculates the travel direction of the radio mobile station based on a direction identification sensor and the state of radio communications with a radio base station.

4. The mobile telecommunications system according to claim 1, wherein the travel velocity detector uses the positioning information from GPS satellites and radio communications state information to calculate the velocity of the radio mobile station.

5. The mobile telecommunications system according to claim 1, wherein the radio base station which operable to previously store the position information on the radio base station and position information on the peripheral radio base stations, and
   the radio base station comprises:
   position information reporter, which reports the position information of the radio base station and the position information of the peripheral radio base stations to the radio mobile station as report information.

6. The mobile telecommunications system according to claim 5, wherein the distance calculator calculate the distance to a peripheral radio base station by using the current position of the radio mobile station detected by the position information detector and the report information from the position information reporter.

7. The mobile telecommunications system according to claim 1, wherein the handover destination determiner compares the distances to the radio base stations in the predicted peripheral radio base station information and the downlink communications qualities of the radio base stations, and determines as one handover destination the radio base station which is the closest to the radio mobile station and which best improves the downlink communications quality.

8. The mobile telecommunications system according to claim 1, wherein the handover controller changes the handover control parameter values based on the peripheral radio base station density calculated from the peripheral radio base station information and performs handover control.

9. The mobile telecommunications system according to claim 1, wherein the handover controller changes the sending power to the radio mobile station based on the peripheral radio base station density calculated from the peripheral radio base station information and performs handover control.

10. A computer-readable medium in which a mobile telecommunications control program for causing a computer to implement:

a feature to-detect a downlink communications quality in the communications between a radio base station and a radio mobile station;

a feature to detect a current position on the radio mobile station;

a feature to calculate distances from the radio mobile station to the radio base stations at the current position;

a feature to detect a travel direction of the radio mobile station at the current position;

a feature to detect a velocity of the radio mobile station at the current position;

a feature to predict a position of the radio mobile station after an arbitrary time interval is elapsed, based on the travel direction and the velocity;

a feature to generate peripheral radio base station information, including distances to respective radio base stations at the predicted position, and downlink communications qualities of respective radio base station at the predicted position;

a feature to determine one radio base station among the radio base stations as a handover destination based on the calculated distance to respective radio base stations and downlink communications quality of respective radio base stations in the peripheral radio base station information; and a feature to change the handover control parameter values and sending power to the radio mobile station based on the peripheral radio base station density calculated from the peripheral radio base station information and performs handover control with the determined radio base station as a handover destination.

* * * * *